(12) United States Patent
Chen et al.

(10) Patent No.: US 10,364,196 B2
(45) Date of Patent: Jul. 30, 2019

(54) MULTI-FUNCTIONAL COATING SYSTEM FOR CEMENTITIOUS COMPOSITE MATERIALS

(71) Applicant: James Hardie Technology Limited, Dublin (IE)

(72) Inventors: Yongjun Chen, Rancho Cucamonga, CA (US); Caidian Luo, Alta Loma, CA (US)

(73) Assignee: James Hardie Technology Limited, Dublin (IE)

( * ) Notice: Subject to any disclaimer, the term of this patent is extended or adjusted under 35 U.S.C. 154(b) by 976 days.

(21) Appl. No.: 13/899,511

(22) Filed: May 21, 2013

(65) Prior Publication Data
US 2014/0349106 A1 Nov. 27, 2014

(51) Int. Cl.
*C04B 41/48* (2006.01)
*C04B 41/00* (2006.01)
*C04B 41/52* (2006.01)
*C04B 41/63* (2006.01)
*C04B 41/71* (2006.01)

(52) U.S. Cl.
CPC ........ *C04B 41/4853* (2013.01); *C04B 41/009* (2013.01); *C04B 41/483* (2013.01); *C04B 41/52* (2013.01); *C04B 41/63* (2013.01); *C04B 41/71* (2013.01); *Y10T 428/256* (2015.01); *Y10T 428/257* (2015.01)

(58) Field of Classification Search
CPC ... C04B 41/009; C04B 20/0048; C04B 28/02; C04B 41/4853; C04B 2103/54; C04B 41/71; C04B 41/63; C04B 41/52; Y10T 428/256; Y10T 428/257
See application file for complete search history.

(56) References Cited

U.S. PATENT DOCUMENTS

| | | | |
|---|---|---|---|
| 2002/0166478 A1* | 11/2002 | Tear ........................... | C09C 1/36 106/436 |
| 2005/0124759 A1* | 6/2005 | Heldmann ............ | C08F 290/00 524/845 |
| 2007/0178313 A1* | 8/2007 | Takada ................ | C08G 18/0866 428/413 |
| 2009/0004468 A1* | 1/2009 | Chen ..................... | C04B 41/009 428/351 |
| 2009/0005494 A1* | 1/2009 | Luo ........................ | C04B 41/009 524/502 |
| 2009/0297818 A1* | 12/2009 | Williams ................. | B29C 70/12 428/292.4 |
| 2011/0108426 A1* | 5/2011 | Hayashi ................. | C09D 5/037 205/50 |

* cited by examiner

*Primary Examiner* — Samir Shah
(74) *Attorney, Agent, or Firm* — Knobbe, Martens, Olson & Bear, LLP

(57) ABSTRACT

Improved coating formulations for cementitious composite building materials are disclosed herein. The coating formulations provide both sealer and primer functions, particularly for substrates in a high alkaline environment, such as fiber cement composite materials. The coating formulations can be applied in a cost-effective single step; exhibit improved adhesion, blocking resistance, water resistance characteristics

10 Claims, 1 Drawing Sheet

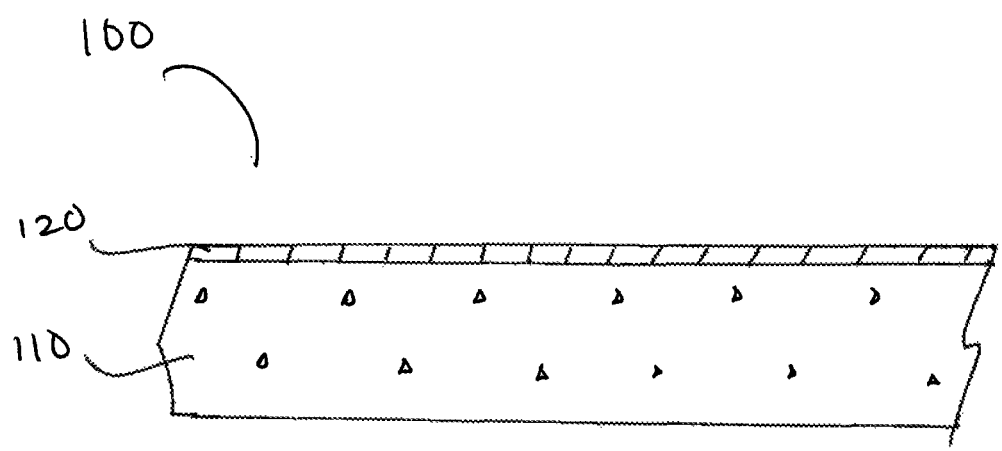

MULTI-FUNCTIONAL COATING SYSTEM FOR CEMENTITIOUS COMPOSITE MATERIALS

BACKGROUND OF THE INVENTION

Field of the Invention

This invention relates generally to coating systems for building materials, and in particular, to a multi-functional coating system for cementitious composite building materials.

Description of the Related Art

Various coating systems have been developed for protecting the exterior surface of building materials. The coating systems may include sealers, primers, and top coats that are each applied to the building material as separate layers of coating. Each layer of coating serves a different function. For example, sealer is usually applied first to seal any porous surface on the building material and to provide surface reinforcement and water resistance functions. After surface sealing, primer is then applied to the surface followed by top coat. The primer is used as the linkage between the sealer and the top coat to facilitate application of the top coat to the surface as well as to provide other functions. The top coat in turn provides long term weathering durability and decorative functions for the building material. Sealers, primers, and top coats all have different compositions because each is formulated to provide a different set of functions. However, many commercially available sealers and primers are not compatible with fiber cement building materials because of the unique surface chemistry of fiber cement substrates.

SUMMARY OF THE INVENTION

Described herein are multi-functional coating systems and formulations that are capable of functioning effectively as both a sealer and a primer. The disclosed coating systems and formulations can be applied in a cost-effective single step and exhibit improved adhesion, blocking resistance, and water resistance characteristics. Moreover, the coating systems and formulations are suitable for use as both a primer and sealer for cementitious materials in a highly alkaline environment, such as fiber cement and other cementitious composite materials.

A coating formulation for cementitious composite materials disclosed herein may comprise a polymer binder, functional pigments, and/or fillers that are each selected to work synergistically in combination with the other components to provide an effective sealer and primer for cementitious composite materials.

In various embodiments, the polymer binder may comprise a thermosetting or a thermoplastic polymer system that is formulated to penetrate the surface of a fiber cement substrate and react to form strong reinforcement of loose fibers on the substrate. The polymer binder may be a crosslinking polymer system. In one embodiment, the polymer binder comprises an acrylic emulsion with aziridine crosslinker. In another embodiment, the polymer binder comprises an acrylic emulsion with a polycarbodiimide based crosslinking agent. In yet another embodiment, the polymer binder comprises an epoxy emulsion with amine crosslinker. The polymer binder may also be a non-crosslinking polymer system. In one embodiment, the polymer binder comprises an epoxy ester dispersion. In another embodiment, the polymer binder comprises functional groups that can subsequently react with, for example, hydroxyl groups on the surface of the cementitious composite material, thus creating a strong reinforcement on the top surface of the material. In certain embodiments, the average particle size of the polymer binder is 100 nanometers (nm) or less and the glass transition temperature ($T_g$) is between 50° C. to 70° C. In certain embodiments, the minimum film formation temperature (MFFT) of the polymer binder is at or below 30° C.

In certain embodiments, the functional pigments and/or the fillers may comprise inorganic compounds with an average particle size of 12 μm or less and oil absorption of 17 or below.

In some embodiments, the coating formulations for cementitious composite materials disclosed herein may comprise up to 80% by weight of at least one polymer, wherein the polymer may be a thermosetting polymer or thermoplastic polymer and may have a glass transition temperature of 50° C. to 70° C. and a minimum film formation temperature of 30° C. or less. The coating formulations may further comprise up to 35% by weight of at least one pigment and up to 15% by weight of at least one filler, wherein the pigment volume concentration is 40% or less. In some embodiments, the coating formulations may have a pigment volume concentration of 12% to 40% with the preferred range of 20% to 30%. In some embodiments, the at least one pigment may be an inorganic compound having a particle size of 12 μm or less and an oil absorption of 17 or less. The pigment may be rutile $TiO_2$. In some embodiments, the at least one filler may be an inorganic compound having an average particle size of 12 μm or less and an oil absorption of 17 or less. The filler may be precipitate $CaCO_3$.

In some embodiments, the coating formulation may comprise, preferably up to 1% by weight, of at least one antiblocking agent. In some embodiments, the at least one anti-blocking agent may comprise potassium silicate, silicon antiblocking agent or fluoropolymer.

In some embodiments, the coating formulation may comprise, preferably up to 5% by weight, of at least one thickener.

Some embodiments also may provide for a coating formulation that further comprises up to 10% by weight of at least one diluent. Some embodiments also may provide for a coating formulation that further comprises up to 3% by weight of at least one coalescent. In some embodiments, the coating formulation may further comprise up to 50% by weight of at least one solvent. In some embodiments, the coating formulation may further comprise up to 1% by weight of at least one catalyst. In some embodiments, the coating formulation may further comprise up to 1% by weight of at least one dispersant. In other variations, the coating formulation may further comprise up to 1% by weight of at least one surfactant. In some embodiments, the coating formulation may further comprise up to 1% by weight of at least one biocide. Some embodiments may provide for a coating formulation that comprises up to 1% by weight of at least one defoamer. In some variations, the coating formulation may comprise up to at least 1% by weight of at least one compound pH adjusters.

In some embodiments, the coating formulation may comprise up to 80% by weight of at least one polymer, wherein said polymer is a thermosetting polymer or thermoplastic polymer and the polymer has a glass transition temperature of 50° C. to 70° C. and a minimum film formation temperature of 30° C. or less; up to 35% by weight of at least one pigment; up to 15% by weight of at least one filler; up to 5% by weight of at least one thickener; up to 10% by weight of at least one diluent up to 3% by weight of at least one coalescent; up to 50% by weight of at least one solvent; up to 1% by weight of at least one catalyst; up to 1% by weight of at least one dispersant; up to 1% by weight of at least one surfactant; up to 1% by weight of at least one biocide; up to 1% by weight of at least one defoamer; and up to at least 1% by weight of at least one pH adjusters; wherein said coating formulation has a pigment volume concentration of 0 to 30%.

In some embodiments, the coating formulation is a multifunctional composition comprising a primer sealer that is applied to a fiber cement composite material. The fiber cement composite material comprises a fiber cement substrate having a cementitious matrix and fibers. A layer of the primer-sealer is disposed on the exterior surface of the fiber cement substrate. The primer-sealer-comprises a thermosetting or thermoplastic polymer binder system, and at least one functional pigment having an average particle size of 12 μm or less and oil absorption of 17 or less, and at least one filler having an average particle size of 12 μm or less and oil absorption of 17 or less. The fiber cement composite material further comprises a top coat layer that is disposed on the primer-sealer. The primer-sealer can be applied to the fiber cement substrate in a single application. The primer-sealer penetrates the exterior surface of the fiber cement substrate, seals the exterior surface of the fiber cement substrate, promotes adhesion between the fiber cement substrate and the top coat layer, and may provide blocking functions as well.

In further embodiments of the invention there is provided a multi-functional coating formulation for cementitious composite materials and a fibre cement composite material as set out in the appended claims. It is to be understood that the foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 shows an example of a fiber cement substrate having a coating formulation according to one embodiment of the invention.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure generally describes an improved coating system and formulation for cementitious composite materials that can achieve an appropriate balance between blocking moisture penetration and maintaining strong adhesion, thereby capable of functioning as both a sealer and primer in a highly alkaline environment. The coating formulation generally includes a polymer binder, functional pigments, and fillers having pre-selected properties. In various embodiments, the polymer binder has a pre-selected glass transition temperature and minimum film formation temperature; the functional pigments and fillers have a pre-selected particle size range and oil absorption properties. In one embodiment, the coating formulation comprises up to 80% of a polymer binder, up to 35% of at least one pigment, and up to 15% of at least one filler.

The polymer binder may comprise thermosetting polymers that form cross-linking systems. Thermosetting polymers include, but are not limited to, aromatic or aliphatic epoxy emulsions; acrylate emulsions; a combination of epoxy emulsions and acrylate emulsions (such as reacting epoxy emulsion and an acrylate emulsion having a carboxylic group in the presence of a catalyst; cross-linking epoxy emulsions; mixtures of cross-linking acrylic emulsions with aziridine; mixtures of oxazaline monomers or polymers; polymers having carboxyl group, and amino salts of acidic compounds as catalysts; acrylic emulsions with polycarbodiimide based crosslinking agents; water based alkyd with driers such as hydrocure driers; and polyurethane (such as those with a hydroxyl group and isocyanate group).

The polymer binder may also comprise non-crosslinking polymers. Functional groups of the polymers can then subsequently react with, for example, hydroxyl groups on the surface of the building materials, thus creating a strong reinforcement on the top surface of the building materials. Examples of a non-crosslinking polymer capable of reacting with the surface of the building materials include, but are not limited, to blocked isocyanates and isocyanate dispersions. Non-limiting examples of a cross-linking polymer system capable of reacting with the surface of the building materials include blocked isocyanate with acrylic emulsions and isocyanate dispersions with acrylic emulsions. Thermoplastic systems include, but are not limited to, polyurethane (such as those with a hydroxyl group and isocyanate group); polyurethane hybrids with acrylic emulsions; epoxy ester dispersions; and combination of epoxy ester dispersion and acrylate emulsions.

The polymer binder may also be hydrophobic and thus have a low acidic content (e.g. low number of acidic groups). However, the acidic groups may be used to react with other functional groups within the polymer itself to form cross-linking systems or with functional groups on the building composite materials to form a reinforced surface.

The polymer binder may also have a particle size of up to about 500 nm. In some embodiments, the particle size may be less than about 400 nm, less than about 300 nm, less than about 200 nm, or less than about 100 nm.

It is desirable that the polymer binder have a higher glass transition temperature (Tg) and yet lower minimum film formation temperature (MFFT). The larger differences between Tg and MFFT will improve film formation and blocking resistance. Polymers used in the disclosed formulations may have a Tg of about 50° C. to about 70° C. and a MFFT of about 30° C. or less than about 30° C. Non-limiting examples of such polymers include acrylic emulsions that have a Tg of 56° C. and MFFT at 26' C.

In some embodiments, the coating formulation has a pre-selected pigment volume concentration (PVC), which may be dependent on the type of polymer used in the coating formulation. The inventors have discovered that if PVC is too high, a loss of adhesion may occur; on the other hand, if PVC is too low, blocking resistance may be compromised.

The coating formulation preferably has a PVC of 0% to 40%, or 0% to 30%, or 10% to 20%, or 10% to 30%, or 20% to 30%, or 12% to 40%.

In some embodiments, the coating formulation includes pigments and fillers that typically exhibit low oil absorption, which allows the polymer to achieve better integrity after film formation. Pigments may include organic or inorganic pigments. The pigment may be an inorganic compound having a particle size less than about 12 μm and oil absorption of less than about 17. Non-limiting examples of pigments include rutile $TiO_2$, $Fe_2O_3$ (yellow), $Fe_2O_3$ (black), zinc phosphate, zinc polyphosphate, modified orthophosphates, other phosphate related compounds, phthalocyanine blue, phthalocyanine green, Diarylide yellow, alkali blue, Toluidine red, polymeric amine salt, amino carboxylate and organic acid amine, zinc stearate, calcium stearate, other stearate-related compounds, and any combinations thereof. In one implementation, the coating formulation may include up to about 35% of at least one pigment.

In some embodiments, the coating formulation includes fillers that are inorganic compounds having a particle size less than about 12 μm and oil absorption of less than about 17. The fillers with oil absorption at or lower than 17 is preferred since it provides better film integrity for better blocking performance while good adhesion is still achieved. Non-limiting examples of fillers include $CaCO_3$, talc, silica, clay, calcined clay, wallostonite, mica, feldspar, calcium silicate, barium sulfate, zinc oxide and any combination thereof. In one implementation, the coating formulations may include up to about 15% of at least one filler.

In some embodiments, the coatings formulation further includes anti-blocking agents that may be used to improve blocking resistance of the coating. Antiblocking agents include but are not limited to, natural and synthetic wax dispersions, potassium silicate, silicon and fluoropolymer related oligomer or polymer. In one implementation, the coating formulation may include up to about 1% of at least one antiblocking agent.

In some embodiments, the coating formulation further includes thickeners. Non-limiting examples of thickeners include conventional polymers (e.g., cellulose ether), associative polymers (hydrophobically modified ethylene oxide urethane, hydrophobically modified alkali soluble emulsion and hydrophobically modified hydroxyl ethyl cellulose), thixotropes (attapulgite and bentonite caly), and metal chelates. In one implementation, the coating formulation may include up to about 5% of at least one thickener.

In some embodiments, the coating formulation may also include a solvent. The solvent may be hydrophilic. In some variations, the solvent is deionized water. In some implementations, the coating formulations may include up to about 50% of solvent.

In some embodiments, the coating formulation also may include a catalyst. A non-limiting example of a suitable catalyst is a hydrocure catalyst and boroacylate driers. In some implementations, the coating formulation may include up to about 1% of catalyst.

Additives may also be added to the coating formulations. Additives that can be used include, but are not limited to, one or more diluents, coalescents, surfactants, dispersion agents, defoamers, leveling agents, biocides, and pH adjusters. The additive(s) used will depend on performance requirements of the formulation. In some embodiments, the coating formulations may include diluents comprising small molecules that can react with the polymers over a time period, such as within a few days. In one implementation, coating formulations disclosed herein may include up to about 10% by weight of-diluent. Examples of diluents include, but are not limited to, oxazolidines and epoxy diluent (for epoxy systems). In some embodiments, the coating formulations may include coalescents. Non-limiting examples of coalescents include ethylene glycol monobutyl ether, diethylene glycol monobutyl ether, ethylene glycol 2-ethylhexyl ether and 2,2,4-trimethyl-1,3-pentanediol monoisobutyrate. Desirable coalescents may also react with the polymers during mixing or after application of the coating formulation to building materials; a non-limiting example of such a suitable coalescent is a propylene glycol monoester of corn oil fatty acid. In one implementation, the coating formulations may include up to about 3% by weight of coalescents.

In some embodiments, the coating formulation may include dispersants. Suitable dispersion agents may be organic or inorganic, including but not limited to polyacid, hydrophobic copolymer polyelectrolyte, block copolymer with pigment affinic groups and phosphates.

In some embodiments, the coating formulation may include surfactants. Non-limiting examples of surfactants include polyether modified dimethylpolysiloxane, benzyl ether, octyl phenoxy polyethoxy ethanol, octylphenol ethoxylate, sulfosuccinate and nonionic surfactants. A hydrophilic lipophilic balance (HLB) nonionic surfactant may be added to improve shelf-life/stability, oven aging, or resistance to freeze-thaw cycling. In one implementation, the coating formulations may include up to about 1% of surfactants.

In some embodiments, the coating formulation may include biocides, mildewcides, and/or algicides, such as families of dioxabicyclo octane, azoniaadamantane chloride, 2-methyl-4-isothiazolin-3-one, and 1,2-Benzisothiazolin-3-one. In one implementation, the coating formulations may include up to about 1% of biocides.

In some embodiments, the coating formulation may include suitable defoamers, which may be silicon based, mineral oil based, and combinations thereof. In one implementation, the coating formulations may include up to about 1% of dispersants.

The coating formulations disclosed herein may also include pH adjusters. Non-limiting examples of pH adjusters include ammonium water solution, ethanol amine, trimine and ethylene diamine. In one implementation, the coating formulations may include up to about 1% of pH adjusters.

The following examples provide greater detail of useful coating formulations for cementitious composite building materials. The examples are not to be construed as limiting the scope of the invention described.

Examples of coating formulations having a PVC of 0 were prepared by mixing all the components for 10 minutes. Two representative examples of such formulations are shown in Table 1.

TABLE 1

| Example 1 (Thermoplastic) | | | Example 2 (Thermosetting) | | |
|---|---|---|---|---|---|
| Component | Exemplary Component | Acceptable Wet Weight % Range | Component | Exemplary Component | Acceptable Wet Weight % Range |
| Polymer | Epoxy ester | 70-80 | Polymer | Epoxy emulsion | 30-40 |
| Dry Catalyst | Hydrocure catalyst | 0-5 | Crosslinker | Amine | 15-25 |
| Solvent | Deionized water | 20-30 | Solvent | Deionized water | 40-50 |

To study adhesion, the coating formulation was applied onto a fiber cement surface at approximately 12.5 μm dry film thickness and dried in an over until the surface temperature reached at least 160° F. A top coat was then applied to reach the appropriate dry film thickness and subsequently dried in an oven until the surface temperature reached at least 160° F. or was left at room temperature until fully dried, depending on the top coat applied therein.

Wet adhesion was evaluated using a modified ASTM D3359, which differed in that samples did not receive an X cut and cross cut. The adhesive was a 1 inch wide adhesive of 3M® Scotch® tape No. 250 applied directly to a coated surface (e.g., primed and/or painted) after the surface (typically the entire sample) was soaked in tap water for about 24 hours (each specimen was weighed before and after soaking in water, and paper towels were used to remove the water from the surface of each sample after soaking). The top surface of the tape was rolled with a 10 lb. rubber roller at for 10 cycles to promote adhesion. Tape was then removed quickly at a 90° angle. Dry adhesion was also evaluated using the same method as wet adhesion test except the samples were soaked in water before tape test.

The pot life of the coating formulations was also evaluated. Pot life refers to the time period (after mixing the reactive components of the coating system) during which the coating can be applied to a substrate without degradation.

Blocking capabilities of the coating formulations were also evaluated. For blocking, a modified ASTM D2793 was used. The specimens were stacked and pressed at about 70 PSI at 125° F. for about 5 minutes. A pressure of 70 PSI is similar to a typical weight of about 10 pallets of composite building materials stacked on top of each other. The elevated temperature is similar to the highest temperature that such a material may be stacked. A value of 1 after blocking testing indicates there is no interaction related bonding between boards. A value of 2 correlates to some blocking issue (boards stick to each other and do not separate automatically). The code of 2(X)s refers to blocking with very minor force to take specimen apart. The code of 2(X)m refers to blocking with moderate force to take specimens apart while 2(X)l refers to blocking with large force to take specimens apart. The minimum requirement is 2(X)s for commercial practice.

Example 1 in Table 1 exhibited a 6% wet adhesion, 0 dry adhesion, blocking at 2(5)m, and no pot life issues. Example 2 in Table 1 exhibited a 3% wet adhesion, 0 dry adhesion, blocking at 2(5)m, and a pot life of 4 hours.

Representative Examples 3 and 4 of coating formulations having a PVC of 30% are shown in Table 2. To prepare these formulations, the pigment paste components were mixed and ground until the particle size dropped to less than 45 The pigment paste was then agitated while all of the letdown components except the thickener was added. Then, the thickener was added while the mixture was slowly agitated.

Example 3 exhibited a 7% wet adhesion, 0 dry adhesion, blocking at 2(3)s, and no pot life issue. Example 4 exhibited a 10% wet adhesion, 0 dry adhesion, blocking at 2(1)s, and a pot life of less than 4 hours.

TABLE 2

| Example 3 (Thermoplastic) | | | | Example 4 (Thermosetting) | | | |
|---|---|---|---|---|---|---|---|
| | Components | Exemplary Component | Acceptable Wet Weight % Range | | Components | Exemplary Component | Acceptable Wet Weight % Range |
| Pigment Paste Components | Solvent | Deionized water | 10-20 | Pigment Paste Components | Solvent | Deionized water | 10-20 |
| | Dispersant | Tamol 165A | <about 1% | | Dispersant | Tamol 165A | <about 1% |
| | Surfactant | Byk 348 | <about 1% | | Surfactant | Byk 348 | <about 1% |
| | Biocide | Nuosept 095 | <about 1% | | Biocide | Nuosept 095 | <about 1% |
| | Defoamer | Defoamer | <about 1% | | Defoamer | Defoamer | <about 1% |
| | Pigment | TiO$_2$ | 25-35% | | Pigment | TiO$_2$ | 25-35% |
| Letdown components | Polymer | Epoxy ester dispersion | 50-60% | Letdown components | Polymer | Epoxy emulsion | 50-60% |
| | | | | | Crosslinker | Amine | |
| | Defoamer | Defoamer | <about 1% | | Defoamer | Defoamer | <about 1% |
| | pH adjuster | NH$_3$H$_2$O | <about 1% | | pH adjuster | NH$_3$H$_2$O | <about 1% |
| | Antiblocking agent | Antiblocking agent | <about 1% | | Antiblocking agent | Antiblocking agent | <about 1% |
| | Thickener | Thickener | 0-5% | | Thickener | Thickener | 0-5% |
| | Solvent | Deionized water | 0-5% | | Solvent | Deionized water | 0-5% |

Representative Examples 5 and 6 of coating formulations having a PVC of 20% and with color are shown in Table 3. To prepare these formulations, the pigment paste components were mixed and ground until the particle size dropped to less than 45 μm. The pigment paste was then agitated while all of the letdown components except the thickener were added. Then, the thickener was added while the mixture was slowly agitated.

Example 5 exhibited a 6% wet adhesion, 0 dry adhesion, and blocking at 2(5)s, no pot life issue. Example 6 exhibited a 5% wet adhesion, 0 dry adhesion, blocking at 2(4)s, and a pot life of less than 4 hours.

TABLE 3

| | Example 5 (Thermoplastic) | | | | Example 6 (Thermosetting) | | |
|---|---|---|---|---|---|---|---|
| | Components | Exemplary Component | Acceptable Wet Weight % Range | | Components | Exemplary Component | Acceptable Wet Weight % Range |
| Pigment Paste Components | Solvent | Deionized water | 10-20 | Pigment Paste Components | Solvent | Deionized water | 10-20 |
| | Dispersant | Tamol 165A | <about 1% | | Dispersant | Tamol 165A | <about 1% |
| | Surfactant | Byk 348 | <about 1% | | Surfactant | Byk 348 | <about 1% |
| | Biocide | Nuosept 095 | <about 1% | | Biocide | Nuosept 095 | <about 1% |
| | Defoamer | Defoamer | <about 1% | | Defoamer | Defoamer | <about 1% |
| | Pigment | $TiO_2$ | <about 5% | | Pigment | $TiO_2$ | <about 5% |
| | Pigment | Zinc stearate | <about 1% | | Pigment | Zinc stearate | <about 1% |
| | Pigment | $Fe_2O_3$ (yellow) | <about 1% | | Pigment | $Fe_2O_3$ (yellow) | <about 1% |
| | Pigment | $Fe_2O_3$ (black) | <about 1% | | Pigment | $Fe_2O_3$ (black) | <about 1% |
| | Filler | Talc | 0-5% | | Filler | Talc | 0-5% |
| | Filler | $CaCO_3$ | 0-10% | | Filler | $CaCO_3$ | 0-10% |
| | Filler | clay | 0-5% | | Filler | Clay | 0-5% |
| Letdown components | Polymer | Epoxy ester dispersion | 60-70% | Letdown components | Polymer | Epoxy emulsion and amine | 60-70% |
| | Defoamer | Defoamer | <about 1% | | Defoamer | Defoamer | <about 1% |
| | pH adjuster | $NH_3H_2O$ | <about 1% | | pH adjuster | $NH_3H_2O$ | <about 1% |
| | Antiblocking agent | Antiblocking agent | <about 1% | | Antiblocking agent | Antiblocking agent | <about 1% |
| | Thickener | Thickener | 0-5% | | Thickener | Thickener | 0-5% |

The coating formulations disclosed herein may be used for application to various types of building composite materials, such as cementitious material, gypsum, or other inorganic composite material.

Some embodiments provide a coating formulation suitable for use on a fiber cement substrate. In some embodiments, the coating formulations disclosed herein exhibit a pre-selected amount of binder and filler to allow the coating formulations to maintain both adhesion and blocking when applied to fiber cement substrates. Moreover, in some embodiments, the disclosed coating formulations may be applied to fiber cement substrates in a cost-effective single step and without applying a sealer in a second application step.

The coating formulations disclosed herein may be applied to cementitious building composite materials using any method known in the art, including but not limited to brushing, spraying, dabbing, and any combinations thereof. The coating formulation may be applied to the entire surface or portions of the surface of these building composite materials. As a non-limiting example, FIG. 1 shows a fiber cement composite material 100 incorporating a single layer of protective coating that functions as both a primer and sealer. The fiber cement composite material 100 comprises a fiber cement substrate 100 having a layer of coating material 120 formed on the upper surface of the substrate 100. The layer of coating material 100 is formulated in accordance with the formulations disclosed herein. The fiber cement material 100 can be configured as a plank, siding board, or other building components.

Although the foregoing description of the preferred embodiments has shown, described and pointed out certain novel features of the invention, it will be understood that various omissions, substitutions, and changes in the form of the detail as illustrated as well as the uses thereof, may be made by those skilled in the art, without departing from the scope of the invention. Particularly, it will be appreciated that the preferred embodiments may manifest itself in other shapes and configurations as appropriate for the end use of the article made thereby.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

What is claimed is:

1. A multi-functional coating formulation for cementitious composite materials containing hydroxyl functional groups, comprising:

50% to 60% by weight of a thermoplastic polymer binder comprising an epoxy ester dispersion containing at least one reactive functional group, the thermoplastic polymer binder comprising a non-crosslinking polymer capable of bonding to the hydroxyl functional groups in the cementitious composite material in a manner so as to form a sealing film on a surface of the composite material;

25% to 35% by weight of a functional pigment dispersed in the thermoplastic polymer binder, the functional pigment being rutile $TiO_2$ having an average particle size greater than 5 microns (μm) and less than 12 microns (μm), wherein the pigment volume concentration of the rutile $TiO_2$ in the coating formulation is about 30%, said functional pigment formulated with an oil absorption level of less than or equal to 17, wherein the oil absorption level in combination with the pigment volume concentration provide the coating formulation with blocking resistance;

10% to 20% by weight of deionized water; and wherein the coating formulation functions as both a sealer and a primer for the cementitious composite material.

2. The coating formulation of claim 1, wherein the polymer binder of said coating formulation has an average particle size of 100 nanometers (nm) or less.

3. The coating formulation of claim 1, wherein the at least one reactive functional group of the epoxy ester dispersion is cross-linkable.

4. The coating formulation of claim 1, wherein the polymer binder comprises a cross-linking agent.

5. The coating formulation of claim 4, wherein the polymer binder further comprises an acrylic emulsion with aziridine crosslinker.

6. The coating formulation of claim 4, wherein the cross-linking agent comprises an amine crosslinker.

7. The coating formulation of claim 4, wherein the polymer binder further comprises an acrylic emulsion with a polycarbodiimide based crosslinking agent.

8. The coating formulation of claim 1, further comprising at least one filler, wherein the at least one filler comprises an inorganic compound having a particle size less than 12 μm and an oil absorption less than about 17.

9. The coating formulation of claim 8, wherein said at least one filler is precipitate $CaCO_3$.

10. The coating formulation of claim 1, wherein the non-crosslinking polymer bonds to the —OH groups on the cementitious substrate.

* * * * *